M. E. LAYNE.
WELL SCREEN.
APPLICATION FILED MAR. 17, 1917.
1,339,898.
Patented May 11, 1920.
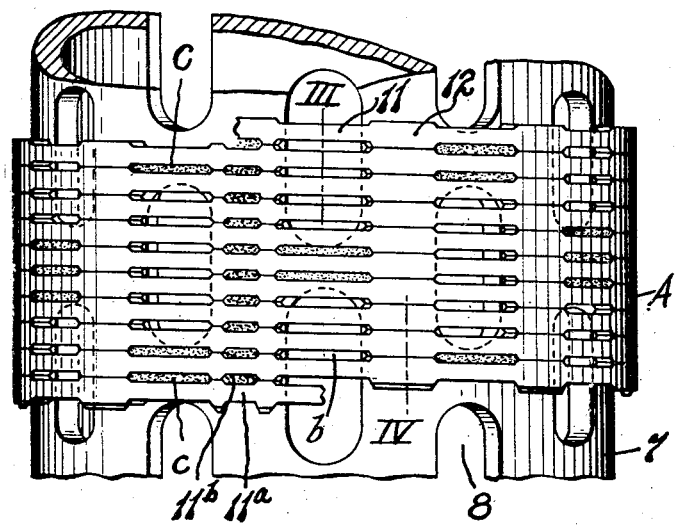
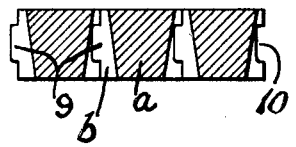
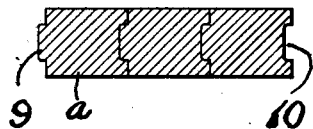
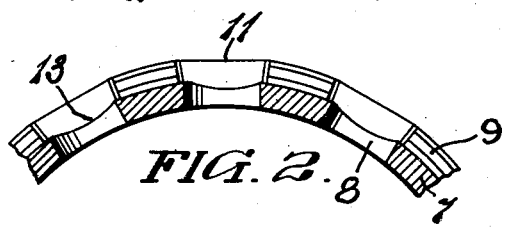
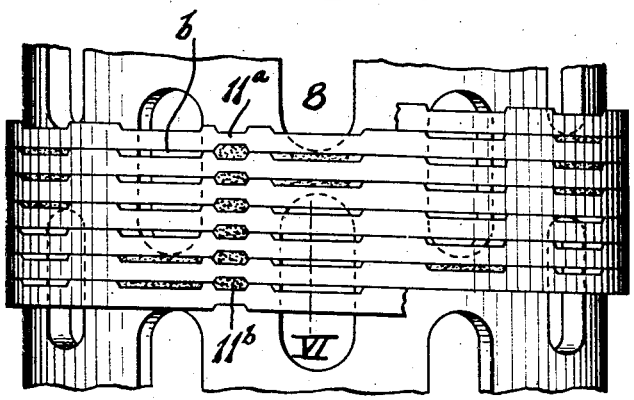
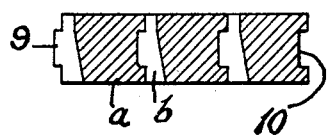
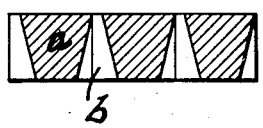

UNITED STATES PATENT OFFICE.

MAHLON E. LAYNE, OF MEMPHIS, TENNESSEE.

WELL-SCREEN.

1,339,898.  Specification of Letters Patent.  Patented May 11, 1920.

Application filed March 17, 1917. Serial No. 155,401.

*To all whom it may concern:*

Be it known that I, MAHLON E. LAYNE, a citizen of the United States, residing at Memphis, in the county of Shelby and State of Tennessee, have invented certain new and useful Improvements in Well-Screens, of which the following is a specification.

This invention relates to an improvement in well screens such as used, for example, in oil and water wells and has for one of its primary objects the provision of an improved well screen in which the strands of the helix of the screening element are interlocking. Another object of the invention consists in the provision of an improved well screen which is practically indestructible and cannot be injured when placing the screen in boulder formations or in rough jagged holes. My invention also contemplates the provision of a well screen which has superior strength characteristics so as to offer a maximum resistance to gas pressure, and still have full openings over the perforations in the well tube or casing.

In addition my invention is directed to an improved well screen in which the metal of the screening element, intermediate the straining openings, is so disposed as to provide in effect a plurality of bars extending longitudinally of the helix and spaced apart at intervals circumferentially thereof.

As an additional object of my invention I provide a well screen which is of such a character that screening wire or bars can be utilized to form the screening helix, which wire or bar can have greater depth or width than the screening wire heretofore employed, thus producing a screen which is much stronger.

Finally, by my improved screen, I am enabled to use a simpler form of screening element and one less difficult to apply; and I also propose to cause the strands of the helix to freeze together and become as though one mass of metal, by a novel feature to be hereinafter pointed out.

The foregoing, together with such other objects as may hereinafter appear, or are incident to my invention, I attain by means of a construction, the preferred embodiment of which I have shown in the accompanying drawings, wherein—

Figure 1 illustrates a short length of perforated screen casing showing one form of my improved screening element wound thereon in the form of a helix; Fig. 2 is a horizontal section through a portion of the casing and screen; Fig. 3 is a section through the screen taken on the line III of Fig. 1; Fig. 4 is a similar section taken on the line IV of Fig. 1; Fig. 5 is a view similar to that of Fig. 1 but of a modified construction; Fig. 6 is a section taken on the line VI of Fig. 5 through the screen; and Fig. 7 is a similar section through a screen of modified characteristics.

Referring now to Fig. 1, it will be seen that I have therein shown a well casing 7 provided with a plurality of elongated perforations 8, which are arranged in rows extending longitudinally of the casing, the perforations of the rows however being arranged in staggered relation so that the perforations of one row will come opposite the portions of metal intermediate perforations of adjacent rows, as will be readily seen.

The screening element consists of a helix A composed of substantially square wire or bar $a$ wound upon the casing. The wire is wrapped upon the casing by means of a wire wrapping machine, such for example as is used in this art for this purpose. The screening wire is provided with a tongue 9 on one horizontal face and a groove 10 on the opposite face, the tongues and grooves of adjacent strands interfitting with one another and locking the strands of the helix firmly together. In addition, the wire at spaced intervals is compressed or thinned out as at 11. The portions 12 intermediate such thinner portions 11 are substantially of the same width as originally, and they correspond somewhat to the lugs which have been struck up on screening wire, such for example as shown in prior patents issued to me, but which are quite different in function and effect, as will appear. Hereinafter I will term these thick portions 12 as spacing lugs, which serve to space apart the strands of the helix so that the thinner portions 11 will form circulating screening spaces $b$. In addition to the thin portions 11 which form the circulating spaces $b$, I form, at one or more places circumferentially, the thin portions $11^a$ which aline and form pockets $11^b$ which pockets are arranged to come opposite metal portions of the supporting casing 7, as shown. These pockets may be filled with solder and when so filled will lock and bind the strands, particularly because of the tongue and groove formation on the lug portions 12. The rigidity and strength of the screen is further increased by placing solder in the circulating channels *b* at points where such circulating channels come opposite to metal, as at points *c*.

The wire is so rolled that when wound upon the casing 7, the lugs 12 will occupy the same relative position, that is to say, the lugs will aline and constitute in effect bars extending longitudinally of the screen with the screening openings therebetween located over the perforations, the bars coming opposite the strips of metal between the rows of perforations. This bar-like effect of the rows of lugs is produced by reason of the fact that the lugs are of such length as to be in bar-like form and because of the interlocking of the tongues and grooves. The particular advantages incident to so constructing the screen as to produce these bar-like effects are that the strands of the helix are completely supported from end to end at a plurality of points which lend rigidity and strength to the entire helix, so that if the casing and screen are inserted in boulder formations or in rough jagged holes, the screen will not be forced out of place or distorted. At the same time a firm, broad seat for the helix on the casing is insured.

It will be noted that the circulating channels *b* aline themselves in rows in opposition to the rows of perforations. By virtue of this arrangement, and because the lugs 12 come opposite metal, I am enabled, if desirable, to compress the thin portions 11 inward slightly, whereby the circulating channels are protected when placing the casing in position. The compression of the screening at this point will cause the material to "flow" and to increase somewhat the depth of the strands, as indicated at 13 in Fig. 2, this deepened portion assisting to lock the coils of the helix in position on the frame, thereby rendering the construction as a whole more rigid and strong. The circulating channels are tapered, with the narrowest portion out. Still another advantage of having the lugs come opposite metal and the circulating spaces opposite the perforations is that a more perfect symmetrical screen is obtained than is the case, for example, where the lugs do not aline and arrange themselves over perforations and are mere nicks struck in the edge of the wire: and as previously pointed out, by the use of my improved construction, I am enabled to employ a much more simple form of screening element than the conoidal screening wire heretofore employed, which wire is somewhat difficult to wind, and I am further enabled to use a much more stout wire, that is, a wire of larger dimension both ways, which of course produces a very strong screen.

In the construction shown in Fig. 5, it will be observed that the wire is so formed that the depressions which form the circulating channels *b* are formed on one side only of the wire; while in Fig. 7 I have shown a screen in which substantially the same square form of wire is utilized, such wire having substantially the same depression and lug formation as the screen shown in Fig. 1, but not having the interlocking tongue and groove features. The construction shown in Fig. 7, however, has all of the advantages incident to the use of a substantially square wire and the arrangement of the depressions and lugs is such that the lugs arrange themselves in longitudinal rows of bar-like effect with the circulating channels coming in opposition to or over the rows of perforations.

In all forms I prefer to treat the sides of the bar or wire, as it is being wrapped, with acid which will rust and in this way cement or freeze together the contacting parts solidly. Since the lugs 12 have contacting faces of substantial dimension, it will be seen that this cementing of the strands of the helix further increases the bar-like effect of the rows of lug portions, lending strength and rigidity to the screen.

The screening wire may be rolled into the shapes indicated while being wrapped or previous to the wrapping operation, as may be desired.

I claim:

1. In a well screen, the combination of a casing having a plurality of rows of perforations extending longitudinally thereof, a screening wire wrapped thereon having alternate thick and thin portions so spaced that the thick portions aline and come opposite the metal between the rows of perforations, while the thin portions aline over the rows of perforations to provide circulating channels, there being solder placed in the circulating channels which come opposite the metal between perforations of a row.

2. In a well screen, the combination of a foraminous supporting frame and a helix of screening wire wrapped thereon, the wire having alternate thick and thin portions spaced so that the thin portions aline, the wire being fastened to the supporting frame where said thin portions come opposite to metal portions of the frame.

3. In a well screen, the combination of a foraminous supporting frame and a helix of screening wire wrapped thereon, the wire having alternate thick and thin portions spaced so that the thin portions aline, the wire being fastened to the supporting frame with solder where said thin portions come opposite to metal portions of the frame.

4. In a well screen, the combination of a tube having perforations therein and a screening helix wound thereon, some of the portions of the helix which come opposite perforations in the tube being forced therein.

5. In a well screen, the combination of a foraminous supporting frame, a helix of screening wire wound thereon, said helix having lug portions substantially co-extensive with the wire in depth and spaced so as to aline, thereby providing bar-like members extending longitudinally of the screen, and interlocking means for the strands of the helix on the horizontal faces of the lug portions.

6. In a well screen, the combination of a foraminous supporting frame, a helix of screening wire wrapped thereon, said wire having alternate thick and thin portions spaced in such manner that the thick portions aline and the thin portions aline, the thick portions being substantially co-extensive with the wire in depth and forming bar-like members extending longitudinally of the screen and the thin portions forming circulating channels, and tongue and groove interlocking means for the strands of the helix on the horizontal faces of the thick portions.

7. In a well screen, the combination of a perforated tube, a helix of screening wire wound thereon having thin portions with outwardly divergent horizontal faces and thick portions with parallel horizontal faces and substantially co-extensive with the wire in depth and the thin portions arranged to aline opposite perforations and the thick portions opposite metal portions of the tube, and interlocking means in the horizontal faces of the thick portions of the helix.

In testimony whereof I have hereunto signed my name.

MAHLON E. LAYNE.